US006636873B1

(12) United States Patent
Carini et al.

(10) Patent No.: US 6,636,873 B1
(45) Date of Patent: Oct. 21, 2003

(54) METHODS AND SYSTEMS FOR SYNCHRONIZATION OF MOBILE DEVICES WITH A REMOTE DATABASE

(75) Inventors: Robert L. Carini, Redwood City, CA (US); Adalberto Cassinera, Redmond, WA (US); Meenaz Merchant, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/550,196

(22) Filed: Apr. 17, 2000

(51) Int. Cl.[7] .............................................. G06F 17/30
(52) U.S. Cl. .............................. 707/201; 707/10; 707/3
(58) Field of Search .............................. 707/201, 10, 8, 707/9, 203, 3, 101; 700/95, 91; 709/228, 101, 213, 248, 207

(56) References Cited

U.S. PATENT DOCUMENTS

| | | | | |
|---|---|---|---|---|
| 5,570,291 A | * | 10/1996 | Dudle et al. ................... | 700/95 |
| 5,937,414 A | * | 8/1999 | Souder et al. .............. | 707/203 |
| 6,000,000 A | | 12/1999 | Hawkins et al. ............ | 707/201 |
| 6,272,545 B1 | * | 8/2001 | Flanagin et al. ............ | 709/228 |

OTHER PUBLICATIONS

Moeller, Michael, "Motorola Newton device set to take wireless Notes.", Oct. 24, 1994, MacWEEK, v8, n42, p72 (1).*

* cited by examiner

Primary Examiner—Hosain T. Alam
Assistant Examiner—Gwen Liang
(74) Attorney, Agent, or Firm—Young Law Firm, P.C.

(57) ABSTRACT

A computer system for synchronizing a mobile device with a remote enterprise database includes a replication database. The replication database is mapped to and maintained as a subset image of the remote enterprise database through a bi-directional replication process. A mobile device gateway server is coupled to the replication database. The mobile device gateway includes a concentrator, which is configured to selectively receive replication data from the replication database, transform the received replication data into a format native to the mobile device and to selectively send the received and transformed replication data to the mobile device. The concentrator is also configured to receive mobile device data, transform and to send the received mobile device data to the replication database. The mobile device gateway server acts as a middle tier between one or more enterprise databases and one or more mobile devices or any network-enabled thin client.

35 Claims, 4 Drawing Sheets

METHODS AND SYSTEMS FOR SYNCHRONIZATION OF MOBILE DEVICES WITH A REMOTE DATABASE

BACKGROUND OF THE INVENTION

1. Field of the Invention

The present invention relates to computer-implemented methods, systems and network architectures for synchronizing mobile computing devices with a remote database.

2. Description of the Related Art

Corporations and other large entities often deploy a large number of salespersons over a large geographical territory to sell their products and/or services. Traditionally, such salespersons have relied upon a number of paper-based calendaring, scheduling and address management systems. With the advent of low power portable electronic devices, many sales agents have come to rely upon a variety of mobile computing devices to implement the functionality of such paper-based systems, as well as to track leads, opportunities, sales and commissions. One example of such mobile computing devices is the laptop computer. As shown in FIG. 1, such laptop computers (shown in FIG. 1 as personal computers (PCs) 110, 112, 114, 116) may be loosely coupled to the corporate sales database 120 via a network 118 (including Local Area Network (LAN) and/or the Internet, for example) via a TCP/IP connection 122 (for example), as is well known in the art. Such an architecture may be implemented to allow the plurality of computers 110, 112, 114, 116 to asynchronously access the enterprise database 120. The plurality of computers 110, 112, 114, 116 may access the remote database 120 to download read-only information therefrom, such as price lists, for example. In addition, the computers 110, 112, 114, 116 may exchange information with the enterprise database 120, both to download information from the database 120 and upload information thereto. Specifically, the computers 110, 112, 114, 116 may each store a subset of the database 120 and may synchronize their databases with the enterprise database 120. In so doing, the computers 110, 112, 114, 116 may add, delete and/or modify information stored within the enterprise database 120 when performing the synchronization procedure. However, such an architecture wherein a potentially large number computers access the database 120 at the same time may undesirably degrade the performance (responsiveness) of the enterprise database 120. Moreover, the need to physically connect the computers 110, 112, 114, 116 to the network 118 through the LAN or a Wide Area Network (WAN) 122 limits the salespersons' mobility and ability to dynamically respond to changing conditions while on sales calls, while in the field.

Despite shrinking footprints and decreasing weight and increasing performance, however, laptop computers remain burdensome, slow and necessitate a substantial period of time from power-on to boot up to a fully functional state. The advent of so-called personal digital assistants (PDAs) and other communication and information processing devices has greatly changed this landscape. For example, the Palm Pilot®, manufactured by Palm, Inc. (of which both wired and wireless versions exist) is a portable digital assistant that may be used to manage personal and business information. Typically, such devices have limited memory and data processing capabilities, at least relative to desktop and laptop computers. The trend in such devices is toward greater connectivity, to enable the data stored thereon to be synchronized with that stored on another computer and to enable the user to wirelessly access networks, such as the Internet. As such, the Palm Pilot® and other so-called thin clients (such as devices running the Palm OS™ operating system form Palm, Inc. or the WinCE operating System from Microsoft Corporation, for example) are transitioning from their original and somewhat limited role as organizers to their new and emerging role as integral extensions of the corporate environment.

To make effective use of such mobile devices in a sales or service environment, the data stored thereon must seamlessly integrate with the data stored on the corporate database. As shown in FIG. 2, mobile devices such as shown at 124 traditionally rely upon a docking station or "cradle" 126 connected to the host computer 110 via a (serial, for example) cable 128. The data stored in the mobile device 124 and the data stored in the laptop 110 may then be synchronized through the cable 128, as is known. For example, synchronization may be carried out by invoking a "HotSync" process, as disclosed in U.S. Pat. No. 6,000,000 to Hawkins et al., entitled "Extendible method and apparatus for synchronizing multiple files on two different computer systems", the disclosure of which is incorporated herein in its entirety.

FIG. 3 shows the steps typically necessary to synchronize a mobile device 124 with a remote database 120. The first step S1 calls for the user to connect the mobile device 124 to the computer 110, either directly or with a cradle, as shown at 126 in FIG. 2. The data residing on the mobile device 124 may then be synchronized with the data residing on the laptop 110 through the cable 128, as shown at S2. A connection between the laptop 110 and the remote enterprise database 120 via the network 118 must then be established (if not already established), as shown at S3. Step S4 calls for the laptop 110 and the enterprise database 120 to bi-directionally synchronize, in order for each to update the other with any information that may have changed since the last synchronization session. Any new information from the enterprise database 120 may then be sent to the mobile device 124, as shown by the bi-directional arrow joining steps S2 and S1.

Such a procedure is cumbersome and necessitates a four-step process each time the user wishes to synchronize with the remote enterprise database 120. Moreover, the disadvantages inherent in the architecture shown in FIG. 1 are still present in the architecture of FIG. 2; namely, the need to employ a slow-starting and cumbersome laptop computer 110 to update the data on lightweight, always-on mobile device such as the Palm Pilot® or WinCE® devices. Moreover, the user must connect the mobile device 124 to the host computer 110 before synchronizing. In addition, there must be a one-to-one correspondence between the mobile devices 124 and the host computer 110. Indeed, each mobile device 124 must be connected to a separate host computer 110 each time synchronization is carried out. Lastly, allowing a great many mobile devices 124 to directly access the enterprise database 120 may degrade its performance and responsiveness.

There has been a long felt need, therefore, for simplified methods, systems and network architectures allowing a large number of potentially geographically disseminated and disconnected users to synchronize the data stored on their mobile devices with data stored within a remote database. Such methods, systems and network architectures should allow a variety of such mobile devices to asynchronously synchronize with a remote database to send information thereto and receive updated information therefrom in a format native to each mobile device. Such methods, systems and network architectures should allow a fine grained control over the data that is downloaded to each mobile device. Preferably, such methods, systems and network architectures should allow real time synchronization between remote databases and mobile devices and should be freely scalable.

SUMMARY OF THE INVENTION

In accordance with the above-described objects and those that will be mentioned and will become apparent below, a computer system for synchronizing a mobile device with a remote enterprise database includes a replication database. The replication database is mapped to and maintained as a subset image of the remote enterprise database through a bi-directional replication process over a computer network. A mobile device gateway server is coupled to the replication database. The mobile device gateway includes a concentrator, which is configured to selectively receive replication data from the replication database, transform the received replication data into a format native to the mobile device and to selectively send the received and transformed replication data to the mobile device. The concentrator is also configured to receive mobile device data from the mobile device, transform and to send the received mobile device data to the replication database. In this manner, the mobile device gateway server acts as a middle tier or bridge between an enterprise database and one or more mobile devices, such as a pager, a wireless portable digital assistant (such as a Palm® or WinCE® device, for example), a Web-enabled telephone and/or any network-enabled wired or wireless thin client.

According to further embodiments, the replication database may be incorporated within the mobile device gateway server or may be external thereto and coupled to the mobile device gateway server by the computer network. The computer network may include the Internet. A plurality of mobile device gateway servers may be provided, each of the plurality being maintained as a subset image of the enterprise database through the bi-directional replication process. The plurality of mobile device gateway servers may be distributed over a geographical area. For example, each of the plurality of mobile device gateway servers may be geographically distributed according to a volume of data to be handled thereby. The mobile device gateway server may be further configured to filter the replication data prior to transforming and sending the replication data to the mobile device. The mobile device gateway server may be configured to selectively limit the replication data sent to the mobile device. The mobile device gateway server may be configured to be accessible over the computer network to enable a selection of the replication data to be sent to the mobile device. The replication database may store a snapshot of each table of replication data to be sent to the mobile device. The replication database may further be configured to share the snapshot among a plurality of mobile devices and to send the shared snapshot to the plurality of mobile devices. The concentrator may be configured to communicate with the mobile device over a wireless channel, a wired channel, a serial interface and/or a TCP/IP interface. The computer network may include a TCP/IP computer network. The mobile device gateway server may be further configured to store one or more conflict resolution rules to resolve conflicts in the replication data, the mobile device data and data stored on the enterprise database.

According to another embodiment thereof, the present invention is a computer-implemented method of synchronizing a mobile computing device to a remote enterprise database, comprising the steps of a) establishing a connection over a computer network between the mobile computing device and a mobile device gateway server, the mobile device gateway server being coupled to a replication database that is maintained as a subset image of the enterprise database, the mobile device gateway server including a concentrator configured to interface with the mobile computing device over the computer network; b) selectively sending replication data from the replication database to the concentrator; c) selectively sending the replication data from the concentrator to the mobile computing device over the computer network; d) selectively sending mobile device data from the mobile computing device to the concentrator over the computer network, and e) sending the mobile device data to the replication database. Step a) may be carried out by establishing a TCI/IP network connection between the mobile computing device and the mobile device gateway server. The replication database may be maintained as a subset image of the enterprise database through a bi-directional replication process. One or both of the steps b) and c) may include the step of filtering the replication data to reduce an amount of replication data that is sent to the mobile computing device and/or to send only selected replication data to the mobile computing device. The replication data sent in steps b) and c) may include snapshots of tables from the replication database. Steps of sharing one or more snapshots among a plurality of mobile computing devices and sending the shared snapshot to each of the plurality of mobile computing devices may also be carried out. A step of evaluating one or more conflict resolution rules may be carried out when a conflict arises between the replication data and the mobile computing device data.

The present invention may also be viewed as a computer network, including an enterprise database; a replication database distinct and remote from the enterprise database, the replication database being mapped to and maintained as a subset image of the enterprise database through a bi-directional replication process; a mobile computing device; a mobile device gateway server, the mobile device gateway server being coupled to the replication database, and including a concentrator, the concentrator being configured to selectively receive replication data from the replication database, transform the received replication data into a format native to the mobile device and to selectively send the received and transformed replication data to the mobile device, the concentrator also being configured to receive mobile device data from the mobile device, transform and to send the received mobile device data to the replication database.

DESCRIPTION OF THE INVENTION

Functional Description

Figure 1:
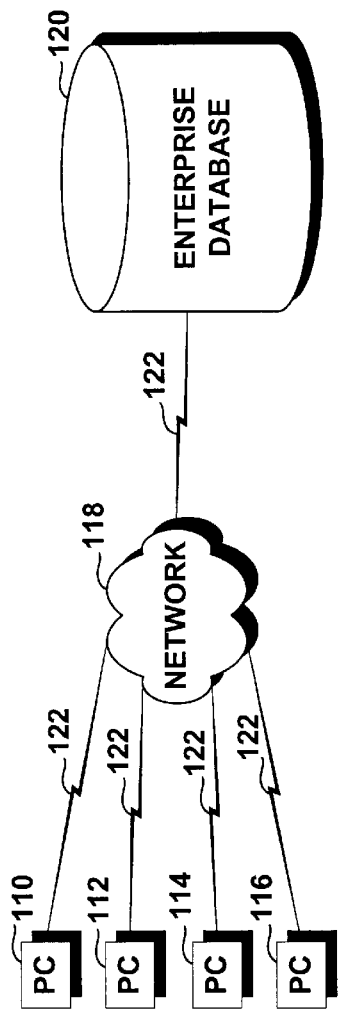
FIG. 1 illustrates a conventional network architecture for synchronizing personal computers to a remote database.
Figure 2:
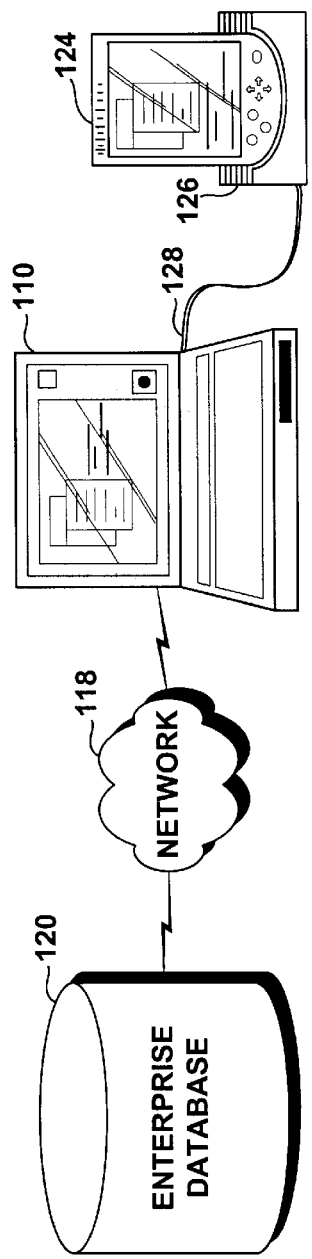
FIG. 2 illustrates a conventional network architecture for synchronizing a mobile device to a remote database.
Figure 3:
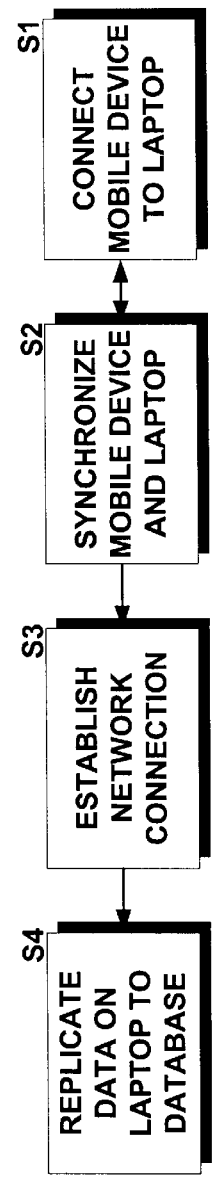
FIG. 3 shows the steps conventionally required to synchronize a mobile device to a remote database.
Figure 4:
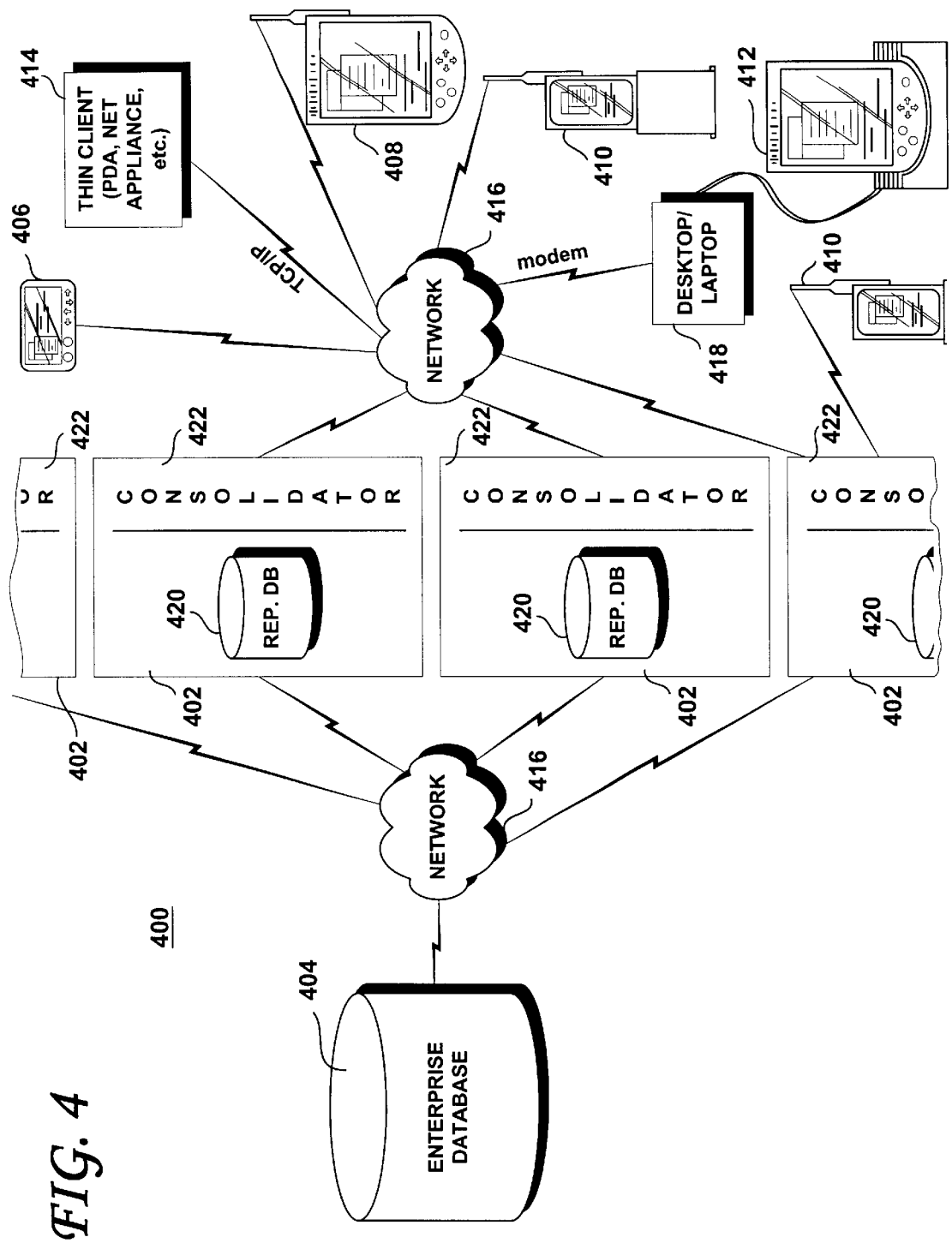
FIG. 4 shows the system and network architecture for synchronizing a mobile device with a remote database, according to an embodiment of the present invention.

FIG. 4 shows a computer system 400 and network architecture for synchronizing a mobile device with a remote database, according to an embodiment of the present invention. As shown therein, the computer system 400 includes one or more mobile device gateway servers 402. Functionally, the mobile device gateway server 402 acts as a middle tier or bridge between one or more enterprise databases 404 and one or more mobile devices, such as a pager 406, wireless PDA 408 (such as a Palm® or WinCE® device, for example), wired PDA 412 connectable to a desktop computer and/or a portable computer 418, a Web-enabled telephone 410 and/or any thin client, collectively referenced at 414. Within the context of the present invention, the phrase "thin client" refers to any device that is configured with only essential equipment and is designed to connect to a central server or servers over a network or a communications channel. Examples of thin clients include the network computer (NC), inexpensive personal computers and/or any other devices that include memory and the ability to execute logic.

The mobile device gateway server 402 may include (or may be coupled to) a replication database 420. According to an embodiment of the present invention, the replication database 420 is mapped to and maintained as a subset image of the enterprise database 404 through a bi-directional replication process over a computer network, such as shown in FIG. 4 at reference numeral 416. The computer network 416 may be a TCP/IP network, for example, and may include the Internet. The computer network 416 may implement other communication protocols in place of or in addition to TCP/IP. The mobile device gateway server 402 may also include a concentrator 422. According to the present invention, the concentrator 422 is configured as an interface layer between the replication database 420 and each of the mobile devices 406, 408, 410, 412, 414. Specifically, the concentrator 422 may be configured to selectively receive replication data from the replication database 420, transform the received replication data into a format native to one or more of the mobile devices 406, 408, 410, 412, 414 and to selectively send the received and transformed replication data to one or more of the mobile devices 406, 408, 410, 412, 414. The concentrator 422 may also be configured to receive mobile device data from one or more of the mobile devices 406, 408, 410, 412, 414 and to transform and to send the received mobile device data back to the replication database 420. According to the present invention, the replication database 420 may be integral to the mobile device gateway server 402 or separate therefrom. According to an advantageous embodiment of the present invention, there is a one-to-one correspondence between the number of mobile device gateway servers 402 and replication database 420.

The three-tiered architecture of the system 400 ($1^{st}$ tier: enterprise database 404; $2^{nd}$ tier: mobile device gateway server(s) 402 and $3^{rd}$ tier: one or more of the mobile devices 406, 408, 410, 412, 414) according to the present invention allows the system 400 to be freely scaled up to accommodate any number of mobile devices 406, 408, 410, 412, 414 and users. Moreover, the mobile device gateway servers 402 may be geographically deployed in remote offices (remote sales offices of a large corporate, for example) and communicate with the enterprise database 404 via a LAN and/or a Wide Area Network (WAN), a Virtual Private Network (VPN) or other type of computer network. The mobile device gateway servers 402 may also be deployed according to local data traffic density to balance the volume of data flowing between the mobile devices 406, 408, 410, 412, 414 and the mobile device gateway server 402 and between the mobile device gateway server 402 and the enterprise database 404. Accordingly, the mobile device gateway servers 402 may be evenly distributed in both a geographical sense within, for example, a corporate sales territory, and in a load sense, wherein high traffic density urban areas (for example) may be assigned more than one mobile device gateway server 402 to accommodate such locally increased data traffic.

The mobile device gateway server(s) 402 may be administered and maintained from the enterprise database 404. According to an embodiment of the present invention, detailed replication logs and replication statistics may be generated and maintained on the enterprise database 404 for each of the mobile device gateway servers 402 within the system 400. The enterprise database 404 may also include tools for defining and maintaining the mobile device gateway server(s) 402 and usage statistics on usage history of the mobile device 406, 408, 410, 412, 414 that are assigned to each of the mobile device gateway servers 402. Using these tools, a particular mobile device 406, 408, 410, 412, 414 may be assigned to and/or removed from selected mobile device gateway server(s) 402.

The replication database(s) 420 and the enterprise database(s) 404 together form a loosely coupled distributed database system in which the subset of data stored therein are maintained in synchronism through the replication process. By employing a distributed database architecture and a replication process, the mobile devices 406, 408, 410, 412, 414 need not repeatedly access the enterprise database 404 to synchronize thereto, thereby minimizing traffic across the network 416, accesses to the enterprise database 404 and maximizing system performance. For example, the replication process utilized may include such replication processes disclosed in *Oracle 8 Server Concepts*, release 8.0 June 1997, or later versions or updates thereof published by the present assignee Oracle Corporation. However, other database replication processes may be employed within the context of the present invention.

Figure 5:
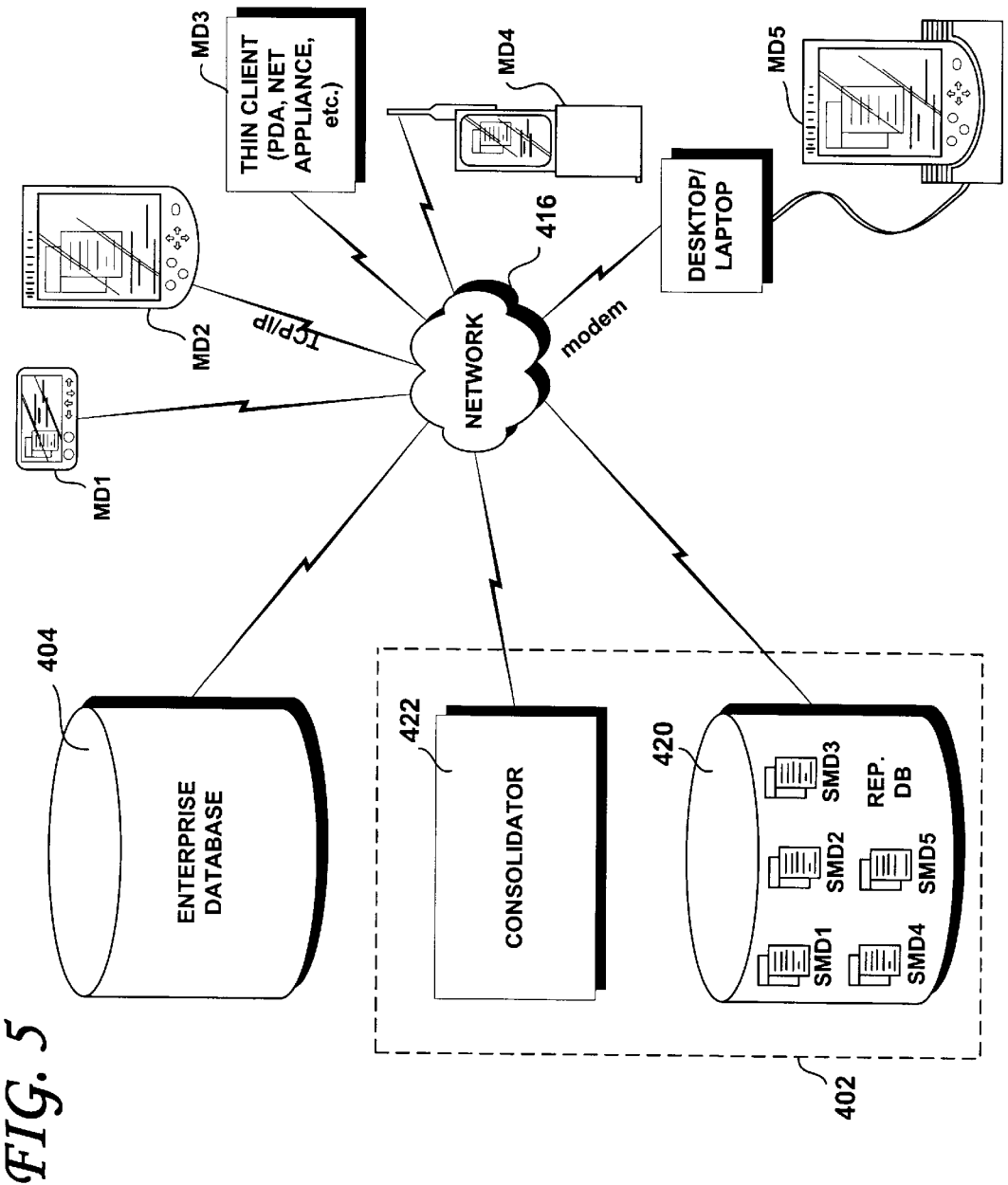
FIG. 5 shows another embodiment of the system and network architecture of the present invention, to illustrate the use of snapshots in synchronizing mobile devices to a remote database.

One implementation of such a replication process is illustrated in FIG. 5. As shown therein, database schemas including snapshots of the data (e.g., tables) to be downloaded to each the mobile devices MD1, MD2, MD3, MD4, MD5 may be stored on the replication database 420. Each of the snapshots SMD1, SMD2, SMD3, SMD4, SMD5 stored in the replication database 420 may contain the latest data from the enterprise database 404 to be downloaded to each of the mobile devices MD1, MD2, MD3, MD4, MD5 via the concentrator 422, as of the last time the user of such mobile devices MD1, MD2, MD3, MD4, MD5 connected to the replication database 420 through the concentrator 422. When each of the mobile devices MD1, MD2, MD3, MD4, MD5 connects to the concentrator 422, data is synchronized bi-directionally, meaning that the mobile devices MD1, MD2, MD3, MD4, MD5 update the replication database 420 and the replication database 420 updates the mobile devices MD1, MD2, MD3, MD4, MD5 with replication data (e.g., snapshots SMD1, SMD2, SMD3, SMD4, SMD5) obtained from the enterprise database 404. In this manner, the replication database 420 may act as a store-and-forward layer using a symmetric synchronization process. Preferably, a synchronization log is kept of all transactions for each of the mobile devices MD1, MD2, MD3, MD4, MD5 and the enterprise database 404. In the case wherein the connection between one of the mobile devices MD1, MD2, MD3, MD4, MD5 and the concentrator 422 fails, the mobile device reverts back to its original state prior to the synchronization attempt, to avoid data loss and partial updates. The maximum number of mobile devices MD1, MD2, MD3, MD4, MD5 that may be simultaneously connected to the concentrator 422 may be dependent upon the hardware capacity (e.g., disk space) of the replication database 420. According to one embodiment, the number of mobile devices MD1, MD2, MD3, MD4, MD5 that may be simultaneously connected to the concentrator 422 is 512. Once this maximum number is reached, subsequent requests for connection to the concentrator 422 may be queued. For example, the replication process may be compatible with Oracle Symmetric Replication, as described in *Oracle 8 Server Concepts* cited above. Alternatively, the replication process may be configured to be compatible with most any replication protocol known in the art. For example, instead of store-and-forward based synchronization, a message-based synchronization may be implemented, with the mobile device gateway server 402 performing conflict resolution tasks.

When conflicts do occur, as when two mobile devices MD1, MD2, MD3, MD4, MD5, 406, 408, 410, 412, 414 attempt to update the same table with conflicting (dissimilar) data, a mechanism must be invoked to resolve the conflict. For example, such a conflict may occur when two salespersons use their mobile devices MD1, MD2, MD3, MD4, MD5, 406, 408, 410, 412, 414 in a disconnected mode (i.e., not coupled to the concentrator 422) to change a stored customer address that is shared among them. When the salespersons attempt to synchronize their mobile devices with the replication database 420, a conflict will arise, as the same customer address field has different values on each of the mobile devices MD1, MD2, MD3, MD4, MD5, 406, 408, 410, 412, 414 that is attempting to synchronize with the enterprise database 404. According to the present invention, one or more rules for conflict resolution may be defined when setting up and configuring the mobile device gateway server 402. For example, a conflict resolution rule may be based upon a time stamp mechanism wherein the salesperson that last updated the conflicting field will succeed in updating the enterprise database 404. When the other salesperson next synchronizes to the enterprise database 404, his or her mobile device MD1, MD2, MD3, MD4, MD5, 406, 408, 410, 412, 414 will receive the updated data; namely, the updated customer address in the example introduced above. The same conflict resolution rule(s) may also apply in the case wherein the same field has been changed on the enterprise database 404 and on one or more of the mobile devices MD1, MD2, MD3, MD4, MD5, 406, 408, 410, 412, 414. Indeed, a time stamp mechanism may be used to determine which of the changed fields is propagated throughout the system 400. Other conflict resolution rules may be freely defined within the context of the present invention.

The replication database 420, when storing snapshots of data to be downloaded to the mobile devices MD1, MD2, MD3, MD4, MD5, 406, 408, 410, 412, 414, must store 1 snapshot for each table used by each of the mobile devices MD1, MD2, MD3, MD4, MD5, 406, 408, 410, 412, 414. For example, if 20 database tables are used by an application resident on the mobile devices MD1, MD2, MD3, MD4, MD5, 406, 408, 410, 412, 414 and there are 1,000 users of such mobile devices, then 20,000 snapshots (such as shown at SMD1, SMD2, SMD3, SMD4, SMD5 in FIG. 5) must be stored in the replication database 420. According to another embodiment of the present invention, snapshots SMD1, SMD2, SMD3, SMD4, SMD5 stored in the replication database 420 may be shared among a plurality of the mobile devices MD1, MD2, MD3, MD4, MD5 of FIG. 5 406, 408, 410, 412, 414 of FIG. 4. This may reduce the need to create separate snapshots SMD1, SMD2, SMD3, SMD4, SMD5 for each table used by each user of each of the mobile devices MD1, MD2, MD3, MD4, MD5, 406, 408, 410, 412, 414. In this case, new access tables may be created for groups of users that share the same snapshots SMD1, SMD2, SMD3, SMD4, SMD5 and hence the same database tables.

Mobile devices, such as shown at 406, 408, 410, 412, 414 in FIG. 4, typically have a somewhat limited storage capacity, as compared, to desktop and laptop computers, for example. It may, therefore, become necessary and desirable to limit the amount and character of the replication data that is sent to the mobile device 406, 408, 410, 412, 414. Indeed, the user of the mobile device 406, 408, 410, 412, 414 may wish to limit the data downloaded to his or her mobile device 406, 408, 410, 412, 414. The user, moreover, may only have permission to access only limited information stored on the replication database 420 and/or on the enterprise database 404. This is frequently the case in sales organizations, for example, in which salespersons are only granted permission to access data related to their customers or to customers within their sales territory and/or to access the data of those having hierarchically-lower positions in the sales force. In addition, users of the mobile device 406, 408, 410, 412, 414 may wish to select the data to be sent to their mobile device 406, 408, 410, 412, 414. For this reason, the mobile device gateway servers 402 and/or the enterprise database 404 may be configured to selectively filter the data that is to be sent to the mobile device 406, 408, 410, 412, 414. Indeed, the mobile device gateway server 402 and/or the enterprise database 404 may be configured to allow the user(s) of the mobile devices 406, 408, 410, 412, 414 to define and execute a search (e.g., a query) on the replication database 420 using, for example, a secure Web-based application over the network 416. The search may be defined to select that information within the replication database 420 of interest to the user of the mobile device 406, 408, 410, 412, 414. For example, within the context of a corporate sales organization, the user of the mobile device 406, 408, 410, 412, 414 may, using a desktop computer, a laptop computer or any web-enabled device, securely log onto the mobile device gateway 402 server (using the Secure Socket Layer (SSL) protocol, for example) using a Web browser to access a Web application configured to allow the user to define a search on particular customers, opportunities, sales activities, scheduling and calendaring information, contact information, sales and compensation forecasting, for example. When such a search is run, the data that is returned may be transformed into a format native to the target mobile device 406, 408, 410, 412, 414 and sent to the user's mobile device 406, 408, 410, 412, 414. Once sent, one or more applications resident on the mobile device 406, 408, 410, 412, 414 may access the information and render it accessible to and manipulable by the user of the mobile device 406, 408, 410, 412, 414. In this manner each user of each mobile device 406, 408, 410, 412, 414 may cause individually selected information to be sent to his or her mobile device 406, 408, 410, 412, 414. Alternatively, the filtering process may defined by rules based on data qualifiers that act as gatekeeper logic to screen and filter the data transferred to the mobile devices 406, 408, 410, 412, 414. Such filtering may reside on the enterprise database 404 and/or on the replication database 420.

Preferably, the database management software (DBMS) administering the replication database 420 assigned to each of the mobile device gateway servers 402 is at least as current as the DBMS running the enterprise database 404. According to an embodiment of the present invention, the DBMS managing the replication database 420 may be the assignee's own Oracle DBMS 8i, while the DBMS managing the enterprise database 404 may be an older version thereof, such as Oracle 8.0.4 Enterprise database. The reason for this is to enable support for the distributed database features of Oracle 8i while supporting older versions of DBMS on the enterprise database 404. In this manner, administrators of the system 400 need not necessarily update the DBMS of the enterprise database 404 to have the same capabilities of that of the DBMS administering the replication database 420, as long as the DBMS of the replication database 420 has the ability to communicate with the DBMS of the enterprise database 404. Therefore, the presence and synchronization operations of the mobile devices 406, 408, 410, 412, 414 may be wholly transparent to the enterprise database 404. Moreover, the distributed database system 400 of FIGS. 4 and 5 may define a heterogeneous database system, in which the DBMS of the database 404, 420 may be developed by separate entities. For example, the enterprise database 404 may be managed by a non-Oracle DBMS through the Heterogeneous Services component integrated within the Oracle 8i DBMS and a Non-Oracle-Specific Heterogeneous Services Agent, as described in *Oracle 8i Distributed Database Systems*, release 8.1.5 © 1999 Oracle Corporation, which is incorporated herein in its entirety. Preferably, the replication database 420 includes a direct connection to the enterprise database 404 through the network 416 via a network interface that allows both the enterprise database 404 and the replication database 420 to access, modify, share and store data on one another. Preferably, the network interface implements a communication protocol (i.e., a set of standards, implemented in software, that governs the transmission of data across a network, such as shown at 416) implemented in widely supported Application Programmatic Interfaces (APIs) to provide distributed database management and processing. One such network interface is Oracle Corp.'s Net8, the specification of which is also incorporated herewith in its entirety.

One application in which the present invention finds particularly advantageous application is in the sales field, where salespersons covering large sales territories operate in a disconnected environment yet must have access to the latest information resident on the enterprise database 404. For such an application, the mobile devices 406, 408, 410, 412, 414 may be programmed with one or more sales-related applications. Advantageously, such sales-related applications may be compatible with or a subset of similar, albeit larger and fuller-featured applications residing on the salespersons' desktop and/or laptop computer or other Internet appliance. Such sales-related applications may then make full use of the replication data sent to the mobile devices 406, 408, 410, 412, 414 by the replication database 420 through the concentrator 422. For example, the mobile device 406, 408, 410, 412, 414 may be programmed with Customer Relationship Management (CRM) applications and/or Enterprise Resource Planning (ERP) applications. For example, one or more of the mobile devices 406, 408, 410, 412, 414 may be programmed with one or more components of a Sales Suite of applications including one or more of the following functional features: customer management, contact management, opportunity tracking, sales forecasting, scheduling and calendaring, commission estimation, and compensation estimation, for example. For example, using such applications on their mobile device 406, 408, 410, 412, 414, salespersons may make the most of their customer information quickly and easily, without the need to boot up a laptop or other similar device. Any information entered into the mobile device 406, 408, 410, 412, 414 may be quickly disseminated to other members of the sales force through quick synchronization with the enterprise database 404. Likewise, any change in the sales-related information entered into the enterprise database 404 may be disseminated to the sales force with ease.

Hardware Description

Figure 6:
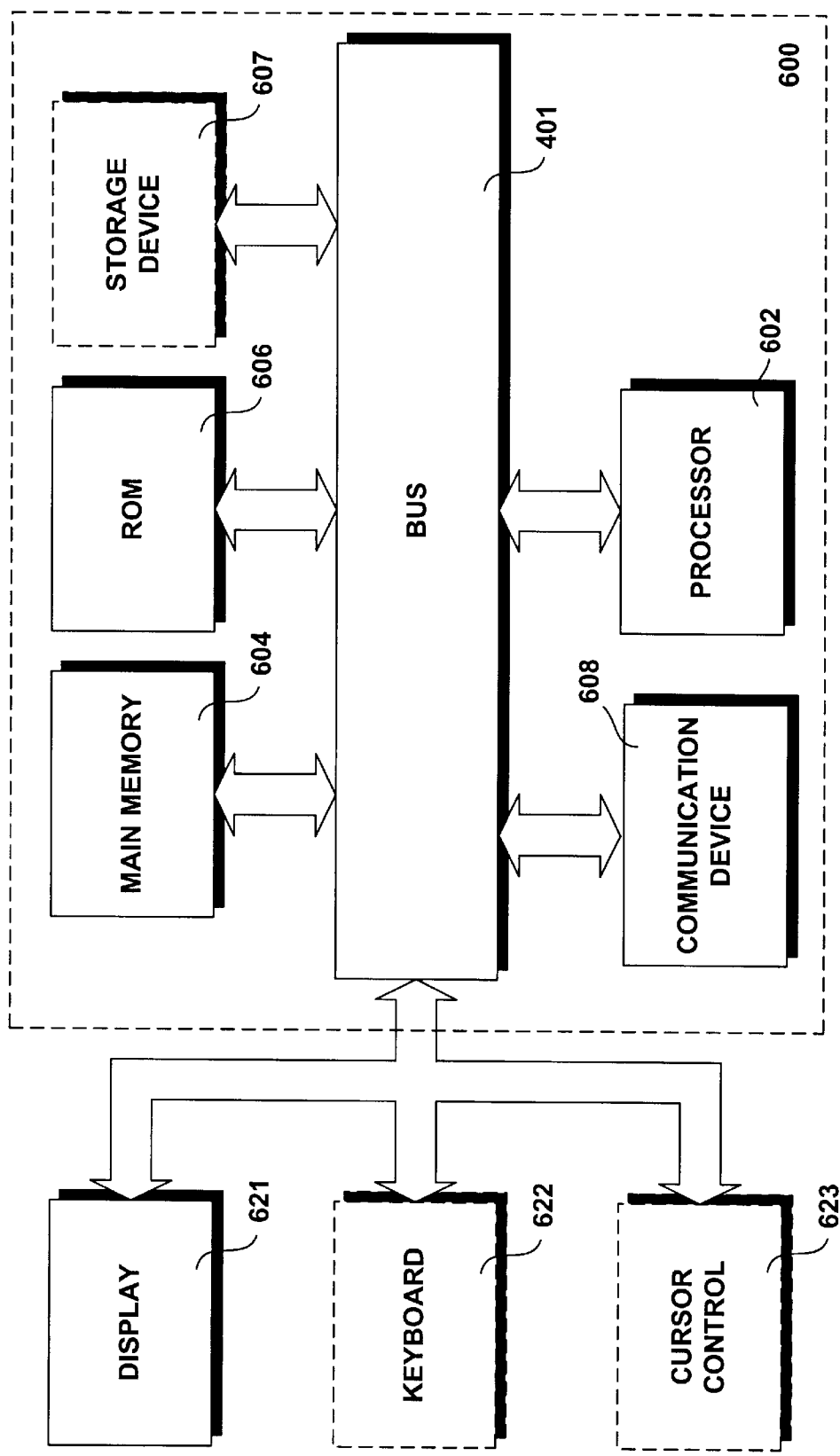
FIG. 6 is a block diagram of a computing device such as a mobile device or a computer, suitable for implementing the present invention.

FIG. 6 illustrates a block diagram of a computing device (including a mobile device, a desktop computer and/or a laptop computer, for example) 600 with which an embodiment of the present invention may be implemented. Computing device 600 includes a bus 601 or other communication mechanism for communicating information, and a processor 602 coupled with bus 601 for processing information. Computer device 600 further comprises a random access memory (RAM) or other dynamic storage device 604 (referred to as main memory), coupled to bus 601 for storing information and instructions to be executed by processor 602. Main memory 604 also may be used for storing temporary variables or other intermediate information during execution of instructions by processor 602. Computing device 600 also includes a read only memory (ROM) and/or other static storage device 606 coupled to bus 601 for storing static information and instructions for processor 602. A data storage device 607, such as a magnetic disk or optical disk, may also be coupled to bus 601 for storing information and instructions. A communication device 608, such as a modem or network adapter (such as Ethernet, for example) card is also coupled to the bus 601 to provide access to a network, such as shown at 416.

The computing device 600 may also be coupled via bus 461 to a display device 621, such as a liquid crystal display, for displaying information to a computer user. An alphanumeric input device 622, including alphanumeric and other keys, is typically coupled to bus 601 for communicating information and command selections to processor 602.

The present invention is related to the use of computing devices 600 to implement methods and systems for synchronizing mobile devices to a remote enterprise database. According to one embodiment thereof, the system for synchronizing mobile devices to a remote enterprise database is provided by one or more computing devices 600 in response to processor(s) 602 executing sequences of instructions contained in memory 604. Such instructions may be read into memory 604 from another computer-readable medium, such as data storage device 607. Execution of the sequences of instructions contained in memory 604 causes processor(s) 602 to implement the methods disclosed herein. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer system embodied on one or more computer-readable media for synchronizing each of a plurality of mobile devices with a remote enterprise database, comprising:

a replication database, the replication database being mapped to the remote enterprise database over a computer network, the replication database maintaining and storing a subset image of the remote enterprise database through a bi-directional replication process, the subset image including a plurality of snapshots, each of the plurality of snapshots being associated with one of the plurality of mobile devices, each snapshot including a latest data from the remote enterprise database to be sent to its associated mobile device over the computer network, the latest data from the remote enterprise database including any updates to data from the remote enterprise database previously accessed by the associated mobile device, as of a last time the associated mobile device connected to the replication database;

a mobile device gateway server, the mobile device gateway server being coupled to the replication database, and including a concentrator, the concentrator being configured to selectively receive at least the subset image from the replication database, transform each snapshot of the received subset image into a format native to its associated mobile device and to selectively send each transformed snapshot to its associated mobile device, the concentrator also being configured to receive mobile device data from the plurality of mobile devices, to transform and to send the received mobile device data to the replication database to update the replication database.

2. The computer system of claim 1, wherein the replication database is incorporated within the mobile device gateway server.

3. The computer system of claim 1, wherein the replication database is external to the mobile device gateway server and coupled thereto by the computer network.

4. The computer system of claim 1, wherein the computer network includes the Internet.

5. The computer system of claim 1, further including a plurality of mobile device gateway servers, each of the plurality maintaining a subset image of the enterprise database through the bi-directional replication process.

6. The computer system of claim 5, wherein the plurality of mobile device gateway servers are distributed over a geographical area.

7. The computer system of claim 6, wherein each of the plurality of mobile device gateway servers is geographically distributed according to a volume of data to be handled thereby.

8. The computer system of claim 1, wherein the mobile device gateway server is further configured to filter the replication data prior to transforming and sending the subset image to the plurality of mobile devices.

9. The computer system of claim 1, the mobile device gateway server is configured to selectively limit data sent to the plurality of mobile devices.

10. The computer system of claim 1, wherein the computer network includes a TCP/IP computer network.

11. The computer system of claim 1, wherein the mobile device gateway server is configured to store and apply at least one conflict resolution rule to resolve conflicts in the subset image, the mobile device data and data stored on the enterprise database.

12. The computer system of claim 1, wherein the replication database is configured to share the subset image among a the plurality of mobile devices and to send the shared subset image to the plurality of mobile devices.

13. The computer system of claim 1, wherein the concentrator is configured to communicate with the plurality of mobile devices over at least one of a wireless channel, a wired channel, a serial interface and a TCP/IP interface.

14. A computer-implemented method of synchronizing each of a plurality of mobile computing devices to a remote enterprise database, comprising the steps of:

a) establishing a connection over a computer network between one of the plurality of mobile computing devices and a mobile device gateway server, the mobile device gateway server being coupled to a replication database that is mapped to the enterprise database, the replication database maintaining and storing a subset image of the remote enterprise database through a bi-directional replication process, the subset image including a plurality of snapshots, each of the plurality of snapshots being associated with one of the plurality of mobile devices, each snapshot including a latest data from the remote enterprise database to be sent to its associated mobile device over the computer network, the latest data from the remote enterprise database including any updates to data from the remote enterprise database previously accessed by the associated mobile device, as of a last time the associated mobile device connected to the replication database, the mobile device gateway server including a concentrator configured to interface with the mobile computing device over the computer network;

b) selectively sending at least the snapshot associated with the mobile device with which the connection was established from the replication database to the concentrator;

c) selectively sending at least the associated snapshot from the concentrator to the mobile computing device with which the connection was established over the computer network;

d) selectively sending mobile device data from the mobile computing device with which the connection was established to the concentrator over the computer network, and e) sending the mobile device data to the replication database.

15. The method of claim 14, wherein step a) is carried out by establishing a TCP/IP network connection between the associated mobile computing device and the mobile device gateway server.

16. The method of claim 14, further including the step of sharing at least one snapshot among a plurality of mobile computing devices and sending the shared snapshot to each of the plurality of mobile computing devices.

17. The method of claim 15, further including the step of evaluating at least one conflict resolution rule when a conflict arises between the subset image and the mobile computing device data.

18. The method of claim 15, wherein the computer network includes the Internet.

19. The method of claim 15, wherein at least one of steps b) and c) includes the step of filtering the subset image to reduce an amount of data that is sent to the associated mobile computing device.

20. A computer network, comprising:

an enterprise database;

a plurality of mobile computing devices;

a replication database distinct and remote from the enterprise database, the replication database being mapped to the enterprise database, the replication database maintaining and storing a subset image of the remote enterprise database through a bi-directional replication process, the subset image including a plurality of snapshots, each of the plurality of snapshots being associated with one of the plurality of mobile devices, each snapshot including a latest data from the remote enterprise database to be sent to its associated mobile device over the computer network, the latest data from the remote enterprise database including any updates to data from the remote enterprise database previously accessed by the associated mobile device, as of a last time the associated mobile device connected to the replication database;

a mobile device gateway server, the mobile device gateway server being coupled to the replication database, and including a concentrator, the concentrator being configured to selectively receive the subset image from the replication database, transform each snapshot of the received subset image into a format native to its associated mobile device and to selectively send each transformed snapshot to its associated mobile device, the concentrator also being configured to receive mobile device data from the plurality of mobile devices, transform and to send the received mobile device data to the replication database.

21. The computer network of claim 20, wherein the replication database is configured to share a selected snapshot among a the plurality of mobile devices and to send the shared snapshot to the plurality of mobile devices.

22. The computer network of claim 20, wherein the concentrator is configured to communicate with the plurality of mobile devices over at least one of a wireless channel, a wired channel, a serial interface and a TCP/IP interface.

23. The computer network of claim 20, wherein the computer network includes a TCP/IP computer network.

24. The computer network of claim 20, wherein the mobile device gateway server is configured to store and apply at least one conflict resolution rule to resolve conflicts in the subset image, the mobile device data and data stored on the enterprise database.

25. The computer network of claim 20, wherein the plurality of mobile devices are wireless devices.

26. The computer network of claim 20, wherein the computer network implements the TCP/IP protocol.

27. The computer network of claim 20, wherein the replication database is incorporated within the mobile device gateway server.

28. The computer network of claim 20, wherein the replication database is external to the mobile device gateway server.

29. The computer network of claim 20, wherein the Internet couples the enterprise database, the mobile device and the mobile device gateway server together.

30. The computer network of claim 20, further including a plurality of mobile device gateway servers, each of the plurality maintaining at least one subset image of the enterprise database through the bi-directional replication process.

31. The computer network of claim 30, wherein the plurality of mobile device gateway servers are distributed over a geographical area.

32. The computer network of claim 31, wherein each of the plurality of mobile device gateway servers is geographically distributed according to a volume of data to be handled thereby.

33. The computer network of claim 20, wherein the mobile device gateway server is further configured to filter the subset image prior to transforming and sending the subset image to the plurality of mobile devices.

34. The computer network of claim 20, the mobile device gateway server is configured to selectively limit the data sent to the plurality of mobile devices.

35. The computer network of claim 20, wherein the mobile device gateway server is configured to be accessible over the computer network to enable a selection of the subset image to be sent to the plurality of mobile devices.

* * * * *

UNITED STATES PATENT AND TRADEMARK OFFICE
CERTIFICATE OF CORRECTION

PATENT NO.     : 6,636,873 B1
DATED          : October 21, 2003
INVENTOR(S)    : Carini et al.

It is certified that error appears in the above-identified patent and that said Letters Patent is hereby corrected as shown below:

<u>Drawings,</u>
Figure 6, "401" should be -- 601 --.

<u>Column 12,</u>
Line 1, "a" should be deleted from "among a the plurality".

<u>Column 13,</u>
Line 29, "a" should be deleted from "among a the plurality".

<u>Column 14,</u>
Line 31, insert -- wherein -- after "claim 20,".

Signed and Sealed this

Second Day of December, 2003

JAMES E. ROGAN
*Director of the United States Patent and Trademark Office*